United States Patent
Wong et al.

(10) Patent No.: US 9,182,166 B2
(45) Date of Patent: Nov. 10, 2015

(54) VEHICLE EVAPORATOR CORE ICING PREVENTION

(71) Applicant: FORD GLOBAL TECHNOLOGIES, LLC, Dearborn, MI (US)

(72) Inventors: David Alan Wong, Troy, MI (US); Debasish Dhar, Canton, MI (US); Manfred Koberstein, Troy, MI (US); William Stewart Johnston, South Lyon, MI (US); Alan Douglas Wallington, Detroit, MI (US); Tina Maurer, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 13/745,931

(22) Filed: Jan. 21, 2013

(65) Prior Publication Data

US 2014/0202185 A1 Jul. 24, 2014

(51) Int. Cl.
- *F25D 21/04* (2006.01)
- *F04B 49/02* (2006.01)
- *F25B 49/02* (2006.01)
- *B60H 1/32* (2006.01)

(52) U.S. Cl.
CPC ............... *F25D 21/04* (2013.01); *B60H 1/321* (2013.01); *F04B 49/02* (2013.01); *F25B 49/022* (2013.01); *B60H 2001/3245* (2013.01); *B60H 2001/3261* (2013.01); *B60H 2001/3272* (2013.01); *B60H 2001/3282* (2013.01); *F25B 2600/0251* (2013.01); *F25B 2700/2106* (2013.01); *F25B 2700/2117* (2013.01)

(58) Field of Classification Search
CPC ........... F25B 49/022; F25B 2600/0251; F25B 2700/2106; F25B 2700/2117; F25D 21/04; B60H 1/00642; B60H 1/00735; B60H 1/321; B60H 2001/3261
USPC .......................................... 62/228.1
See application file for complete search history.

(56) References Cited

U.S. PATENT DOCUMENTS

| | | | |
|---|---|---|---|
| 4,350,021 A * | 9/1982 | Lundstrom | 62/150 |
| 4,930,698 A * | 6/1990 | Takekawa et al. | 236/49.3 |
| 2006/0005552 A1 | 1/2006 | Anyoji et al. | |
| 2007/0277544 A1* | 12/2007 | Honda et al. | 62/228.3 |
| 2008/0196424 A1 | 8/2008 | Shah et al. | |
| 2011/0082594 A1* | 4/2011 | Dage et al. | 700/278 |

FOREIGN PATENT DOCUMENTS

| | | |
|---|---|---|
| JP | 07215048 A | 8/1995 |
| KR | 20030041564 | 5/2003 |
| KR | 20040102882 | 12/2004 |

OTHER PUBLICATIONS

English translation of JP07215048 (6 pages).
English translation of KR20030041564 (7 pages).
Engllish translation of KR2004102882 (9 pages).
Sensors for Air-Conditioning in Automobiles, http://www.epcos.com/web/generator/Web/Sections/ProductCatalog/Sensors/TemperatureMeasurement/ApplicationNotes/01_SensorsAirConditioningAN1/PDF_SensorsAirConditioningAutomotive_AN1,property=Data_en.pdf;/PDF_Sen (5 pages).

* cited by examiner

*Primary Examiner* — Jonathan Bradford
(74) *Attorney, Agent, or Firm* — Vichit Chea; Brooks Kushman, P.C.

(57) ABSTRACT

A climate controller device may be configured to perform operations including comparing an outside air temperature to a threshold temperature; selecting, based on the comparison, one of a function to determine target compressor off setpoint values for relatively lower temperatures and a function to determine target compressor off setpoint values for relatively higher temperatures; retrieving a value according to the selection function to determine target compressor off setpoint values, the value specifying a compressor off setpoint value corresponding to airflow configuration settings; and determining a target compressor off setpoint value based at least in part on the retrieved value.

20 Claims, 3 Drawing Sheets

VEHICLE EVAPORATOR CORE ICING PREVENTION

BACKGROUND

Air conditioning (A/C) evaporator cores may ice up in cold conditions, as water may condense when the air is being cooled. To prevent icing of the evaporator, the temperature in the evaporator core is prevented from falling below a certain temperature. A vehicle may be equipped with a temperature sensor to read the evaporator core temperature, where the sensor output may be utilized in accordance with settings of a climate control module (CCM) to cycle the compressor. These settings to cause the control module to turn the compressor off and on may be referred to as setpoints. The compressor setpoints may be set to provide a balance between maximum cooling performance and prevention of the evaporator core from freezing (icing).

Heating, ventilation and air conditioning (HVAC) systems that prevent evaporator core icing typically have only one set of compressor on and off setpoints. Thus, to reduce the risk of evaporator core freezing, the HVAC system may utilize a setpoint higher than would be necessary in all conditions, thereby compromising A/C performance in situations where a lower setpoint may be possible without icing.

SUMMARY OF THE INVENTION

A climate controller device may be configured to perform operations including comparing an outside air temperature to a threshold temperature; selecting, based on the comparison, one of a function to determine target compressor off setpoint values for relatively lower temperatures and a function to determine target compressor off setpoint values for relatively higher temperatures; retrieving a value according to the selection function to determine target compressor off setpoint values, the value specifying a compressor off setpoint value corresponding to airflow configuration settings; and determining a target compressor off setpoint value based at least in part on the retrieved value.

DETAILED DESCRIPTION

Figure 1:
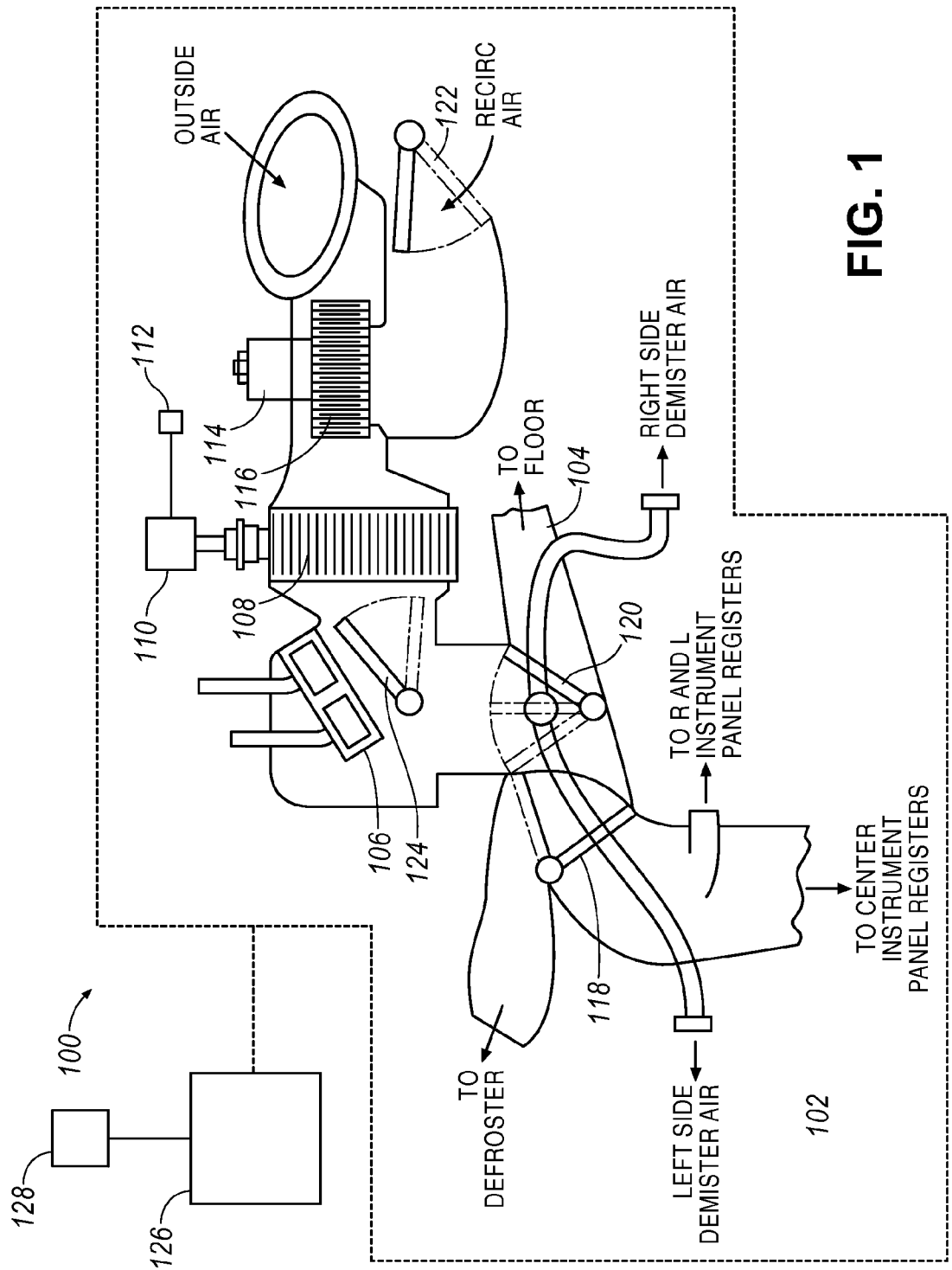
FIG. 1 illustrates an exemplary schematic view of a vehicle climate control system for environmental management of a vehicle.

A/C components of a vehicle HVAC system may include a sensor operable to deactivate the compressor under certain conditions, such as when the temperature of the evaporator core drops below a predetermined value. The sensor may be placed at a location identified as being the coldest location downstream of the evaporator core. However, the coldest evaporator core location may sometimes vary due to variation in various factors. For example, HVAC mode settings (e.g., panel, floor) and HVAC blower speed may affect airflow over the core, which in turn may affect a likelihood and initial location of core freezing. Because the temperature sensor may not be in the coldest location of the core, the temperature sensor reading may not indicate a freezing condition and may continue to permit the compressor to operate, resulting in a freezing up of the components.

An improved HVAC control strategy may be implemented to automatically address these and other core freezing situations. Based on received inputs, the improved HVAC control strategy may utilize an icing heuristic to adjust the compressor off setpoint based on additional factors not previously considered for the adjustment of the setpoint. Using an ambient temperature threshold, the icing heuristic may determine whether to use a setpoint configuration table for higher or lower temperature conditions. Based on the selected function (e.g., using a configuration table), the icing heuristic may determine a temperature sensor compressor off setpoint according to other additional factors (e.g., HVAC mode, HVAC blower speed). In addition to determining the compressor off setpoint, the HVAC control strategy may be further configured to utilize the icing heuristic to calculate a compressor on setpoint using a function (e.g., using a configuration table), adjusting the on setpoint as needed as the compressor off setpoint is adjusted. Accordingly, the HVAC control strategy may utilize the icing heuristic to determine compressor on and off setpoints optimized for the specific additional factors to avoid core icing, without sacrificing A/C performance in other situations.

Additional factors to be considered by the improved HVAC control strategy may include various sources of information, such as: an outside ambient temperature sensor, an HVAC module blower motor speed sensor (e.g., measured in voltages or %) and an HVAC airflow distribution mode (e.g. panel mode, floor mode, etc.). Other inputs may be used as well, such as: in-vehicle humidity, external humidity or an in-car particulate filter sensor input. While HVAC blower speed and HVAC airflow distribution mode are used as exemplary factors herein, it should be noted that the HVAC control strategy may rely on one or any combination of additional factors in determining the compressor off and on setpoints.

In some examples, the HVAC control strategy may be implemented in whole or in part in software that resides in a CCM of the HVAC system. The strategy may reside in the CCM as the CCM may implement the icing heuristics to determine the compressor on and off setpoints. Additionally, the improved HVAC control strategy may be configured to work on one or both of manual and automatic temperature control (ATC) CCMs, provided that the systems include A/C components suitable for use with configurable setpoints.

FIG. 1 illustrates an exemplary schematic view of a vehicle climate control system 100 for environmental management of a vehicle. The vehicle climate control system 100 may include air processing components configured to heat, cool, and otherwise process air according to a HVAC control strategy, as well as distribution components configured to distribute or otherwise direct the processed airflow to one or more zones of the passenger cabin 102 of the vehicle by way of associated ducting 104.

The air processing components may include air heating components, such as a heater core 106. The air processing components may also include air conditioning (A/C) components, such as an evaporator core 108 and a compressor 112. In some instances, the compressor 112 may be electrically driven, while in other instances the compressor 112 may be mechanically driven by a vehicle engine. The A/C components of the system 100 may also include a low-pressure cycle switch 110 in communication with the compressor 112 operable to deactivate the compressor 112 under certain conditions, such as when the temperature of the evaporator core 108 drops below a predetermined value. This deactivation of the compressor 112 may be performed to aid in the prevention of freezing of the evaporator core 108 in cold conditions. The system 100 may also include fan components including, for example, a HVAC blower 114 and blower wheel 116 for generating airflow of the air being processed.

To control the distribution of the airflow through the ducting 104, the air distribution components may include an arrangement of airflow doors including, for example, a panel-defrost door 118 facilitating the selective direction of airflow to the panel/defrost vents, a floor-panel door 120 facilitating the selective direction of airflow to the floor vents, and an outside recirculated air door 122 facilitating the selection of passenger cabin 102 or outside air as input to the HVAC system. A temperature control blend door 124 may also be included to provide for hot air mixing to obtain a desired target discharge air temperature to be exited from the system 100 into the passenger cabin 102. To facilitate the selective distribution of air, one or more of the doors 118, 120, 122, and 124 may be positioned as open, partially open, or closed. In some cases, one or more of the doors 118, 120, 122, and 124 may be driven by vacuum motors that provide for positioning of the doors according to amount of vacuum, e.g., by using vacuum, partial vacuum and no vacuum positions. In some cases, one or more of the doors 118, 120, 122, and 124 may be driven by way of an electric servo motor to facilitate the selective positioning of the doors.

The system 100 may further include an EATC module such as controller 126 configured to control the operation of the system 100. The controller 126 may be configured to receive inputs from a vehicle occupant via the climate control head 128 to facilitate the occupants of the vehicle in selecting environmental conditions in the vehicle. The climate control head 128 may be included as part of a vehicle instrument panel, and may be configured to allow a vehicle occupant to manually control the HVAC functions, and in some cases, override an automatic operation of the system 100. As some examples, the climate control head 128 may include controls such as: a mode selector configured to allow an occupant to choose where airflow will be directed by the panel-defrost door 118 and floor-panel door 120, a temperature selector configured to allow an occupant to select a preferred cabin air temperature, an A/C control to allow an occupant to manually select or deselect use of the compressor 112, a recirculation selector to allow for control of the recirculated air door 122 to select recirculation of cabin air, fresh air, or some combination thereof, and a fan selector configured to allow an occupant to choose fan speed settings for the HVAC blower 114 and blower wheel 116.

Figure 2:
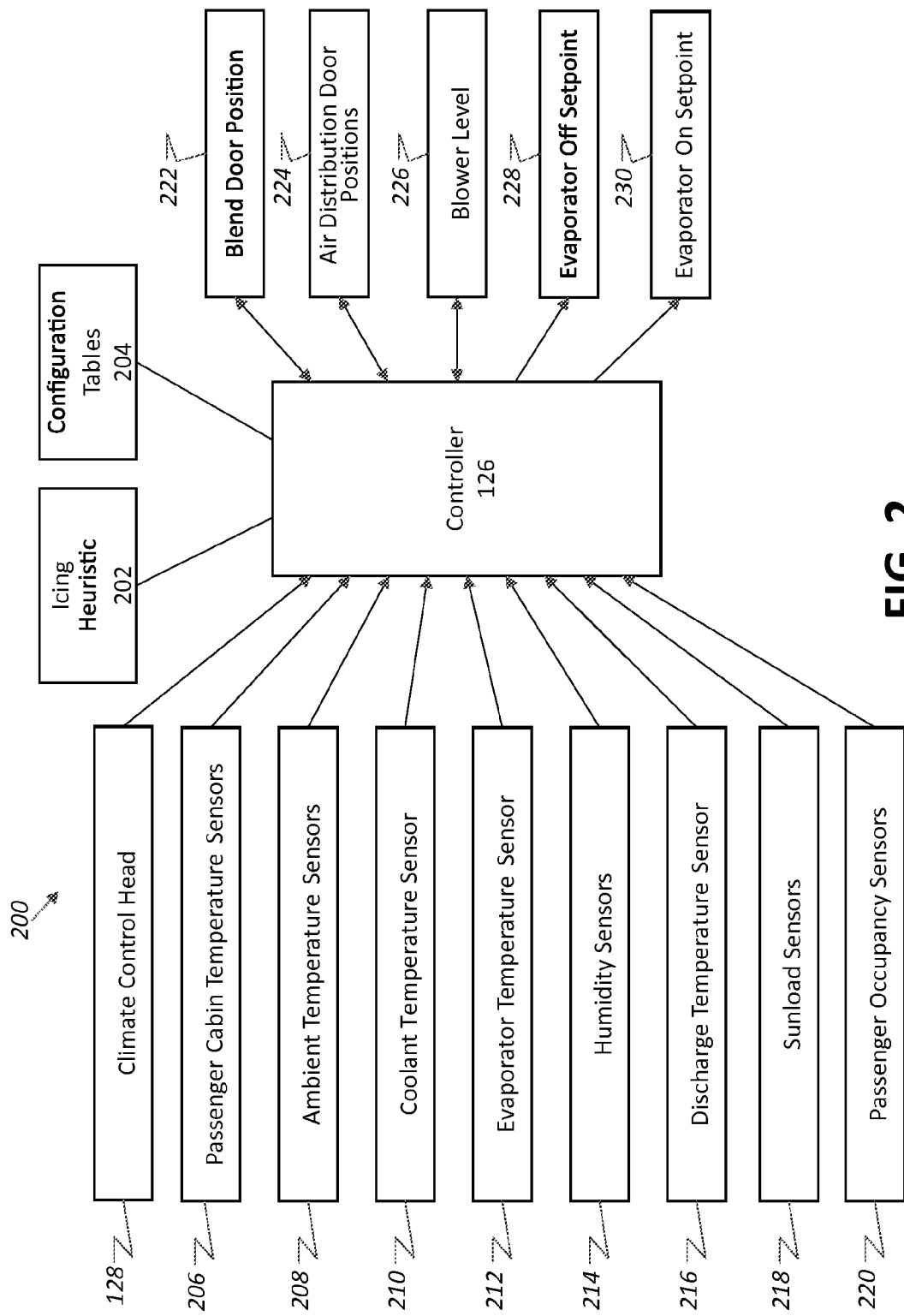
FIG. 2 illustrates an exemplary block diagram of a control system of a vehicle climate control system for implementing an HVAC strategy utilizing an icing heuristic to determine optimized variable compressor setpoints.

FIG. 2 illustrates an exemplary block diagram of a control system 200 of a vehicle climate control system 100 for implementing an HVAC strategy utilizing an icing heuristic 202 and configuration tables 204.

The exemplary control system 200 may utilize the controller 126 to receive inputs from a vehicle occupant via climate control head 128, and to generate commands to control aspects of the vehicle climate control system 100, such as air heating components, air conditioning components, fan components, doors and other air distribution components. For example, the control system 200 may utilize the controller 126 to provide an output 222 to control a temperature control blend door 124, an output 224 to control positioning of one or more air distribution doors, and an output 226 to control fan components such as the HVAC blower 114.

With respect to the sensors, the controller 126 may be configured to receive inputs from: one or more passenger cabin temperature sensors 206 configured to provide information representative of interior cabin temperature, ambient temperature sensors 208 configured to provide information representative of ambient (outside) air temperature, an engine coolant temperature sensor 210 configured to provide information representative of the engine coolant temperature for use in determining available heat, an evaporator temperature sensor 212 configured to provide information representative of the temperature of the evaporator core 108, humidity sensors 214 configured to provide information representative of the relative humidity of the passenger cabin, discharge air temperature sensors 216 configured to provide information representative of the discharge air temperature into the passenger cabin 102, sun-load sensors 218 configured to utilize photodiodes or other elements to provide information related to sun-loading and direction as it related to various zones of the vehicle, and passenger occupancy sensors configured to provide information related to which seats of the vehicle are occupied.

Moreover, the control system 200 may further utilize the controller 126 to provide variable compressor on and off setpoints 228 and 230 according to the icing heuristic 202, the configuration tables 204 and various additional factors. The icing heuristic 202 may include various application logic to determine the compressor on and off setpoints. In some examples, the icing heuristic 202 may be implemented in software that resides in a memory of the controller 126 and that is executed by a processor of the controller 126.

The configuration tables 204 may include setpoint values for various conditions, indexed according to values indexed according to various additional factors. In some cases, the control system 200 may utilize different configuration tables 204 for different conditions. As a more specific example, the control system 200 may include configuration tables 204 targeted to different ambient temperature conditions, where configuration tables 204 may each include setpoint values that vary according to HVAC blower speed and HVAC mode.

Thus, the controller 126 may be programmed with an HVAC control strategy utilizing the icing heuristic 202 to determine compressor on and off setpoints according to various factors, such as HVAC mode, HVAC blower speed, ambient conditions, and vehicle-specific variables. As explained in further detail with respect to FIG. 3 the controller 126 may utilize the icing heuristic 202 to select a relevant configuration table 204 including setpoint information related to additional factors, and determine the optimized compressor on and off setpoints according to the additional factors.

Figure 3:
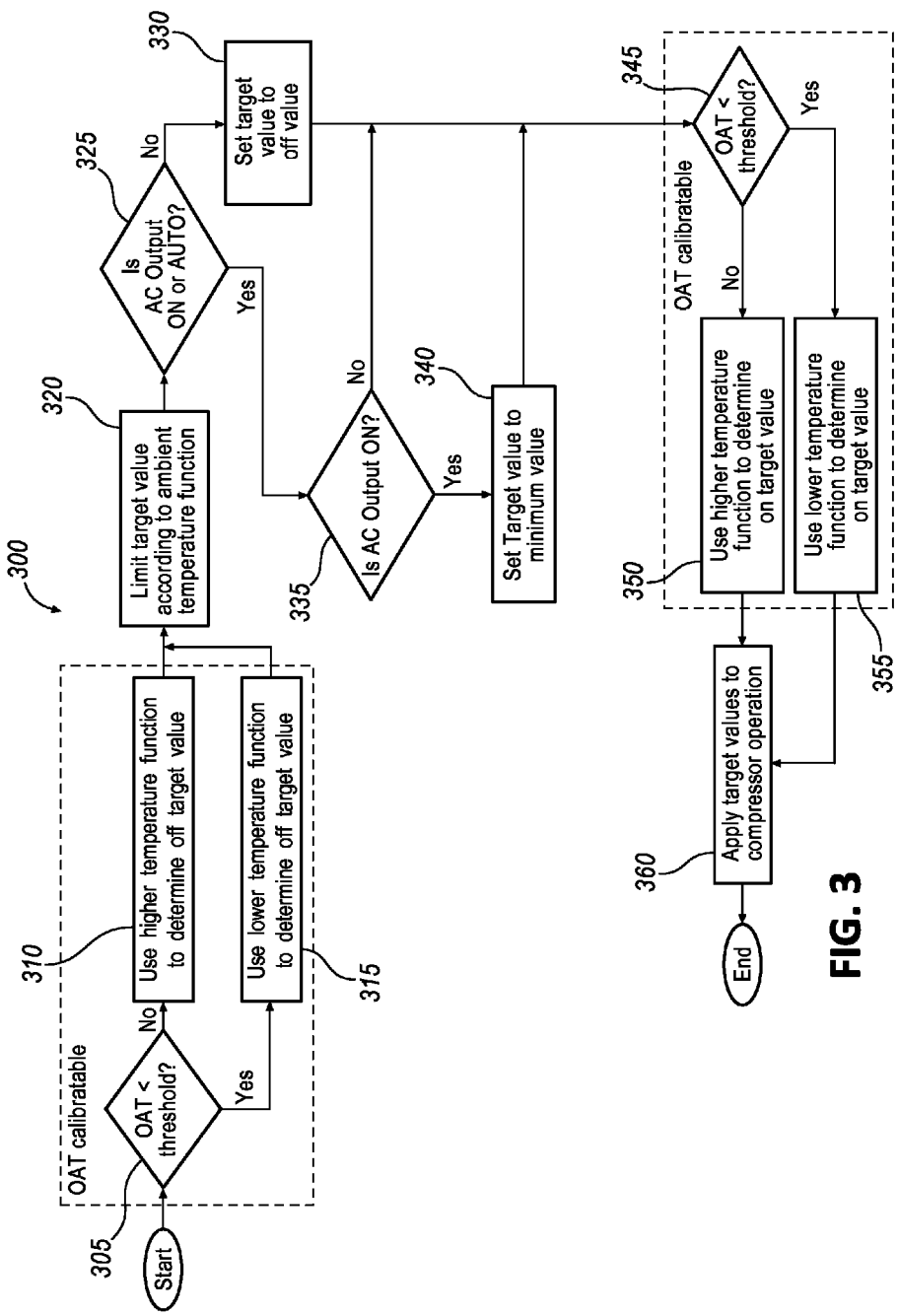
FIG. 3 illustrates an exemplary process for implementing an HVAC strategy in a vehicle climate control system utilizing an icing heuristic to determine optimized variable compressor setpoints.

FIG. 3 illustrates an exemplary process 300 for implementing a variable setpoint HVAC strategy in a vehicle climate control system 100. The process 300 may be performed by various devices, such as by a controller 126 utilizing the icing heuristic 202 in combination with the components of the system 100. By utilizing the icing heuristic 202, the HVAC control strategy may improve the performance of the compressor 112, while at the same time minimizing the risk of evaporator core 108 icing.

In decision point 305, the controller 126 determines whether the outside air temperature (OAT) is less than a threshold temperature. For example, the controller 126 may receive an input from an ambient temperature sensor 208 configured to provide information representative of OAT, and may compare the resultant information to the threshold temperature. In some examples, the threshold temperature may be set to approximately 30° Celsius, but other values are possible. If the OAT is not less than the threshold temperature, control passes to block 310. Otherwise, control passes to block 315.

In block 310, the controller 126 identifies a target compressor 112 off setpoint value for relatively higher temperature conditions. For example, the controller 126 may utilize the icing heuristic 202 to select a configuration table 204 of target setpoint values for relatively higher temperature, indexed according to additional factors. The additional factors may include factors such as the current HVAC blower speed and HVAC mode settings. The controller 126 may be configured to utilize the icing heuristic 202 to identify a current HVAC blower speed and HVAC mode settings, and to retrieve a value from the selected configuration table 204 corresponding to the current HVAC blower speed and HVAC mode settings.

Table 1 illustrates an exemplary configuration table 204 including a mapping of exemplary target compressor 112 off setpoint values for relatively higher temperature conditions. The exemplary configuration table 204, as well as the tables discussed in detail below, includes setpoint values in terms of degrees Celsius for sake of explanation. Moreover, the exemplary configuration table 204 includes the specified setpoint values indexed according to HVAC blower speed (in this example specified in terms of Volts provided to the HVAC blower 114) and HVAC mode settings (e.g., panel, floor, max def).

TABLE 1

Exemplary Mapping of Target Compressor Off Setpoints

| Blower (V) | Panel | Panel/Floor | Floor | Flr/WS | WS | Max A/C | Flr/Pnl/WS | Pnl/WS | Max Def |
|---|---|---|---|---|---|---|---|---|---|
| 3 | 2.00 | 2.00 | 2.00 | 2.00 | 2.00 | 2.00 | 2.00 | 2.00 | 2.00 |
| 4 | 2.00 | 2.00 | 2.00 | 2.00 | 2.00 | 2.00 | 2.00 | 2.00 | 2.00 |
| 5 | 2.00 | 2.00 | 2.00 | 2.00 | 2.00 | 2.00 | 2.00 | 2.00 | 2.00 |
| 6 | 2.00 | 2.00 | 2.00 | 2.00 | 2.00 | 2.00 | 2.00 | 2.00 | 2.00 |
| 7 | 2.00 | 2.00 | 2.00 | 2.00 | 2.00 | 2.00 | 2.00 | 2.00 | 2.00 |
| 8 | 2.00 | 2.00 | 2.00 | 2.00 | 2.00 | 2.00 | 2.00 | 2.00 | 2.00 |
| 9 | 2.00 | 2.00 | 2.00 | 2.00 | 2.00 | 2.00 | 2.00 | 2.00 | 2.00 |
| 10 | 2.00 | 2.00 | 2.00 | 2.00 | 2.00 | 2.00 | 2.00 | 2.00 | 2.00 |
| 12 | 2.00 | 2.00 | 2.00 | 2.00 | 2.00 | 2.00 | 2.00 | 2.00 | 2.00 |
| 14 | 2.00 | 2.00 | 2.00 | 2.00 | 2.00 | 2.00 | 2.00 | 2.00 | 2.00 |

The Table 1 may be utilized to allow adjustment and lookup of setpoints according to the additional factors. Because the additional factors are taken into account, the setpoints may be adjusted to lower temperatures when possible to provide additional performance while still minimizing evaporator core icing. For instance, if blower speed is increased, the setpoint may be lowered due to the increased airflow and reduced likelihood of freezing. As another example, certain HVAC modes may provide higher throughput, and those modes may also allow for a relatively lower setpoint due to the reduced likelihood of freezing. While the Table 1 includes discrete values, it should be noted that application of the table may employ linear interpolation between the specified parameter values. Moreover, the values in the Table 1 are merely exemplary, and all table values may be calibrated for a particular application (such as for a particular vehicle) and may be adjustable via a configuration interface. Thus, different vehicle models may utilize different configuration tables 204. After block 310, control passes to block 320.

In block 315, the controller 126 identifies a target compressor 112 off setpoint value for relatively lower temperature conditions. Similar to as discussed above, the controller 126 may utilize the icing heuristic 202 to select a configuration table 204 of target setpoint values for relatively lower temperature, indexed according to additional factors. For instance, the additional factors may include the current HVAC blower speed and HVAC mode settings. The controller 126 may be configured to utilize the icing heuristic 202 to identify a current HVAC blower speed and HVAC mode settings and retrieve a value corresponding to these current HVAC blower speed and HVAC mode settings.

A table similar to that illustrated in Table 1 may include an exemplary configuration table 204 including a mapping of exemplary target compressor 112 off setpoint values for relatively lower temperature conditions according to HVAC blower and HVAC mode factors.

As with Table 1, the table for relatively lower temperature conditions may be utilized to allow adjustment of the setpoints to minimize evaporator core icing. However, the exemplary configuration table 204 for relatively lower temperature conditions is utilized for cases having a relatively lower ambient temperature. Different values may be specified for lower ambient temperature, as a lower airflow temperature may result in a relatively lower core temperature and a correspondingly higher risk of icing. After block 315, control passes to block 320.

In block 320, the controller 126 limits the target compressor 112 off setpoint value based according to ambient temperature. For example, the controller 126 may utilize the icing heuristic 202 to select to table of target setpoint values according to ambient temperature using input from the ambient temperature sensor 208, and may retrieve a limiting value according to the current ambient temperature. In some examples, the ambient temperature setpoint table may employ a step function providing setpoint limits according to ambient temperature, such that the table-entry and corresponding target values are not linearly interpolated. Table 2 illustrates an exemplary ambient temperature offset table.

TABLE 2

Exemplary Target Compressor Off Setpoints According to Ambient Temperature

| OAT (C) | Target Value |
|---|---|
| 0 | (Minimum) |
| 5 | (Minimum) |
| 10 | (Minimum) |
| 12 | 6.5 |
| 20 | 6.5 |
| 30 | 6.5 |

In some cases, the configuration table 204 of ambient temperature setpoints may include specific degree values, while in other cases the configuration table 204 may include constant values, such as a value specifying a minimum available setpoint (e.g., in some cases 2° Celsius). Based on the retrieved value, the controller 126 may limit the target compressor 112 off setpoint value to a minimum temperature to ensure an adequate off setpoint to prevent passenger cabin 102 fogging conditions.

In decision point 325, the controller 126 determines whether the HVAC system is operating with settings according to user input or an automatic mode, or whether the HVAC system is off. If the HVAC system is determined to be operating either in a manual or automatic capacity, control passes to decision point 335. Otherwise control passes to block 330.

In block 330, the controller 126 sets the target evaporator temperature to a value utilized when the compressor 112 is off. As an exemplary value, the controller 126 may set the target evaporator temperature to a relatively high value, such as 8° Celsius. After block 330 control passes to decision point 345.

In decision point 335, the controller 126 identifies whether the A/C output is on. For example, the controller 126 may determine whether the MAX A/C or an A/C required defrost mode are active. If so, control passes to block 340. Otherwise, control passes to decision point 345.

In block 340, the controller 126 sets the target evaporator temperature to a minimum value. For example, the controller 126 may set the target evaporator temperature to a minimum available setpoint (e.g., 2° Celsius). After block 340, control passes to decision point 345.

In decision point 345, similar to as in decision point 305, the controller 126 determines whether the OAT is less than a threshold temperature. For example, the controller 126 may receive an input from an ambient temperature sensor 208 configured to provide information representative of OAT, and may compare the resultant information to the threshold temperature. In some examples, the threshold temperature may be set to approximately 30° Celsius, but other values are possible. If the OAT is not less than the threshold temperature, control passes to block 350. Otherwise, control passes to block 355.

In block 350, the controller 126 identifies a target compressor 112 offset value for relatively higher temperature conditions. For example, the controller 126 may utilize the icing heuristic 202 to select a table of target offset values for relatively higher temperature, indexed according to the current HVAC blower speed and HVAC mode settings, and may retrieve an offset value corresponding to the current HVAC blower speed and HVAC mode settings. Table 3 illustrates a mapping of exemplary target compressor 112 offset values for relatively higher temperature conditions according to HVAC blower and HVAC mode factors.

heuristic 202 to select a table of target offset values for relatively lower temperature, indexed according to the current HVAC blower speed and HVAC mode settings, and may retrieve an offset value corresponding to the current HVAC blower speed and HVAC mode settings. A table similar to that illustrated in Table 3 may include a mapping of exemplary target compressor 112 offset values for relatively lower temperature conditions according to HVAC blower and HVAC mode factors.

After block 355, control passes to block 360.

In block 360, the controller 126 applies the target value to compressor operation. For example, the controller 126 may set the compressor on setpoint according to the sum of the compressor off setpoint plus the determined compressor offset value. After block 360, the process 300 ends.

Computing devices such as the controller 126 generally include computer-executable instructions executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical

TABLE 3

Exemplary Mapping of Target Compressor Offsets

| Blower (V) | Panel | Panel/Floor | Floor | Flr/WS | WS | Max A/C | Flr/Pnl/WS | Pnl/WS | Max Def |
|---|---|---|---|---|---|---|---|---|---|
| 3 | 2.00 | 2.00 | 2.00 | 2.00 | 2.00 | 2.00 | 2.00 | 2.00 | 2.00 |
| 4 | 2.00 | 2.00 | 2.00 | 2.00 | 2.00 | 2.00 | 2.00 | 2.00 | 2.00 |
| 5 | 2.00 | 2.00 | 2.00 | 2.00 | 2.00 | 2.00 | 2.00 | 2.00 | 2.00 |
| 6 | 2.00 | 2.00 | 2.00 | 2.00 | 2.00 | 2.00 | 2.00 | 2.00 | 2.00 |
| 7 | 2.00 | 2.00 | 2.00 | 2.00 | 2.00 | 2.00 | 2.00 | 2.00 | 2.00 |
| 8 | 2.00 | 2.00 | 2.00 | 2.00 | 2.00 | 2.00 | 2.00 | 2.00 | 2.00 |
| 9 | 2.00 | 2.00 | 2.00 | 2.00 | 2.00 | 2.00 | 2.00 | 2.00 | 2.00 |
| 10 | 2.00 | 2.00 | 2.00 | 2.00 | 2.00 | 2.00 | 2.00 | 2.00 | 2.00 |
| 12 | 2.00 | 2.00 | 2.00 | 2.00 | 2.00 | 2.00 | 2.00 | 2.00 | 2.00 |
| 14 | 2.00 | 2.00 | 2.00 | 2.00 | 2.00 | 2.00 | 2.00 | 2.00 | 2.00 |

After block 350, control passes to block 360.

In block 355, the controller 126 identifies a target compressor 112 offset value for relatively lower temperature conditions. For example, the controller 126 may utilize the icing medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. An application configured to perform the operations of the controller 126, such as the icing heuristic 202, may be one such computer program product and may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    selecting, based on an outside air temperature, one of a configuration table of target compressor off setpoint values for lower temperature conditions and a configuration table of target compressor off setpoint values for higher temperature conditions;
    retrieving a value from the selected configuration table specifying a compressor off setpoint value corresponding to a current blower speed and mode setting; and
    setting a target compressor off setpoint value based on the retrieved value.

2. The method of claim 1, further comprising:
    determining a minimum target compressor off setpoint value according to ambient temperature; and
    limiting the target compressor off setpoint value based according to the minimum target compressor off setpoint value.

3. The method of claim 1, further comprising applying the target compressor off setpoint value to operation of a compressor of an HVAC system.

4. The method of claim 1, further comprising:
    selecting a configuration table of target compressor offset values for relatively lower temperature if the outside air temperature is less than a threshold temperature and otherwise selecting a configuration table of target compressor offset values for relatively higher temperature;
    retrieving a value from the selected configuration table of compressor offset values, the value specifying a compressor offset value corresponding to a current HVAC blower speed and a HVAC mode setting; and
    determining a target compressor on setpoint value based at least in part on the retrieved value.

5. The method of claim 4, further comprising determining the target compressor on setpoint value according to a sum of the target compressor off setpoint value and the retrieved offset value.

6. The method of claim 1, further comprising at least one of:
    overriding the target compressor off setpoint value to a minimum setpoint value when it is determined that at least one of maximum cooling and cooling-implemented defrost output is required; and
    overriding the target compressor off setpoint value to a high setpoint value when it is determined that use of compressor is not required.

7. A climate controller device configured to perform operations comprising:
    comparing an outside air temperature to a threshold temperature;
    selecting, based on the comparison, one of a function to determine target compressor off setpoint values for relatively lower temperature conditions and a function to determine target compressor off setpoint values for relatively higher temperature conditions;
    retrieving a value according to the selected function to determine a target compressor off setpoint value, the value specifying the compressor off setpoint value corresponding to current airflow configuration settings; and
    setting a target compressor off setpoint value based at least in part on the retrieved value.

8. The climate controller device of claim 7, wherein the airflow configuration settings include blower speed and HVAC mode, the function to determine target compressor off setpoint values for relatively higher temperatures referencing a first configuration table of setpoint values indexed according to blower speed and HVAC mode, and the function to determine target compressor off setpoint values for relatively lower temperatures referencing a second configuration table of setpoint values indexed according to blower speed and HVAC mode.

9. The climate controller device of claim 7, further configured to perform operations comprising:

determining a minimum target compressor off setpoint value according to the ambient temperature; and limiting the target compressor off setpoint value based according to the minimum target compressor off setpoint value.

10. The climate controller device of claim 7, further configured to perform operations comprising applying the target compressor off setpoint value to operation of a compressor of an HVAC system.

11. The climate controller device of claim 7, further configured to perform operations comprising:

selecting one of a function to determine target compressor offset values for relatively lower temperatures and a function to determine target compressor offset values for relatively higher temperatures;

retrieving an offset value from the selected configuration table of compressor offset values, the value specifying a compressor offset value corresponding to airflow configuration settings; and determining a target compressor on setpoint value based at least in part on the retrieved offset value.

12. The climate controller device of claim 11, wherein the airflow configuration settings include blower speed and HVAC mode, the function to determine target compressor offset values for relatively higher temperatures referencing a first configuration table of offset values indexed according to blower speed and HVAC mode, and the function to determine target compressor offset values for relatively lower temperatures referencing a second configuration table of offset values indexed according to blower speed and HVAC mode.

13. The climate controller device of claim 11, further configured to perform operations comprising determining the target compressor on setpoint value according to a sum of the target compressor off setpoint value and the retrieved offset value.

14. The climate controller device of claim 7, further configured to perform operations comprising at least one of:

overriding the target compressor off setpoint value to a minimum setpoint value when it is determined that at least one of maximum cooling and cooling-implemented defrost output is required; and overriding the target compressor off setpoint value to a high setpoint value when it is determined that compressor use is not required.

15. A system, comprising:

an air conditioning compressor;

an climate controller device configured to perform operations comprising:

comparing an outside air temperature to a threshold temperature;

selecting, based on the comparison, one of a configuration table of target compressor off setpoint values for relatively lower temperature conditions and a configuration table of target compressor off setpoint values for relatively higher temperature conditions;

retrieving a value from the selected configuration table of compressor off setpoint values, the value specifying a compressor off setpoint value corresponding to a current HVAC blower speed and a HVAC mode setting; and applying the target compressor off setpoint value to operation of the compressor.

16. The system of claim 15, wherein the climate controller device is further configured to perform operations comprising:

determining a minimum target compressor off setpoint value according to ambient temperature; and limiting the target compressor off setpoint value according to the minimum target compressor off setpoint value.

17. The system of claim 15, further comprising a temperature sensor configured to provide a temperature of an evaporator core, wherein the climate controller device is further configured to perform operations comprising:

receiving a temperature of the evaporator core from the temperature sensor;

comparing the temperature of the evaporator core to the target compressor off setpoint value; and turning off the compressor if the temperature of the evaporator core is less than the target compressor off setpoint value.

18. The system of claim 15, wherein the climate controller device is further configured to perform operations comprising:

selecting a configuration table of target compressor offset values for relatively lower temperature if the outside air temperature is less than the threshold temperature and otherwise selecting a configuration table of target compressor offset values for relatively higher temperature;

retrieving a value from the selected configuration table of compressor offset values, the value specifying a compressor offset value corresponding to a current HVAC blower speed and a HVAC mode setting; and determining the target compressor on setpoint value according to a sum of the target compressor off setpoint value and the retrieved offset value.

19. The system claim 18, further comprising a temperature sensor configured to provide a temperature of the evaporator core, wherein the climate controller device is further configured to perform operations comprising:

receiving a temperature of an evaporator core from the temperature sensor;

comparing the temperature of the evaporator core to the target compressor on setpoint value; and turning on the compressor if the temperature of the evaporator core is higher than the determined target compressor on setpoint value.

20. The system of claim 15, wherein the climate controller device is further configured to perform operations including at least one of:

overriding the target compressor off setpoint value to a minimum setpoint value when it is determined that at least one of maximum cooling and cooling-implemented defrost output is required; and overriding the target compressor off setpoint value to a high setpoint value when it is determined that use of the compressor is not required.

* * * * *